April 25, 1950   L. C. WEATHERS   2,505,019
ALTERNATING-CURRENT COMMUTATOR MOTOR
Filed June 8, 1948   3 Sheets-Sheet 1
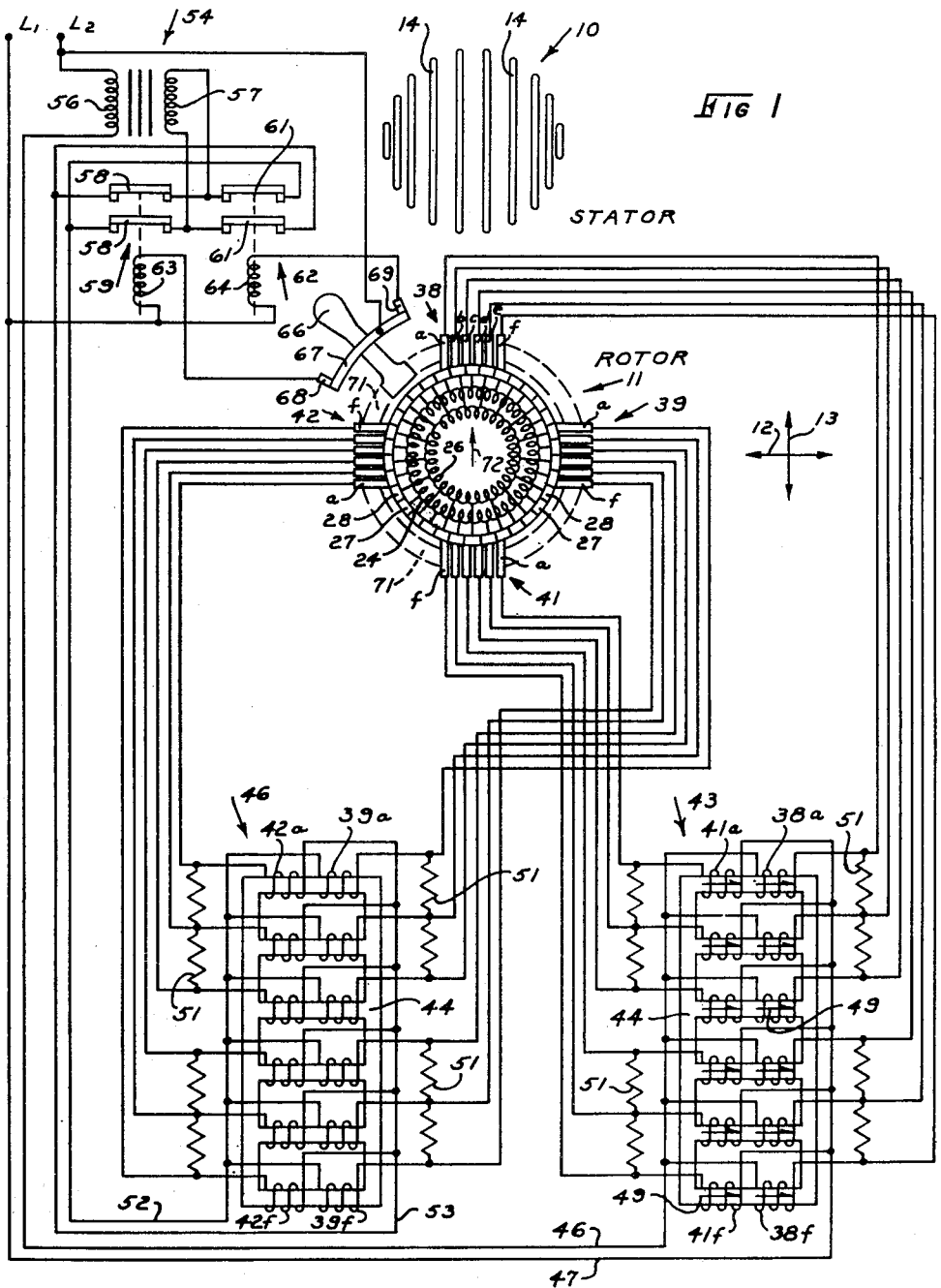
INVENTOR.
LELAND CLAY WEATHERS
BY Bacon & Thomas
Attorneys April 25, 1950          L. C. WEATHERS          2,505,019
ALTERNATING-CURRENT COMMUTATOR MOTOR
Filed June 8, 1948          3 Sheets-Sheet 2
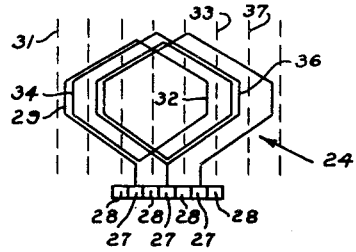
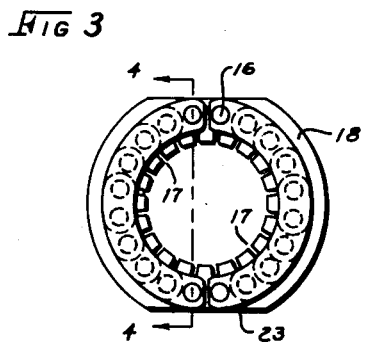
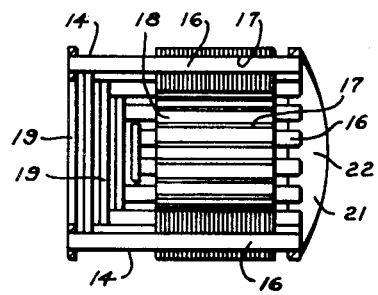
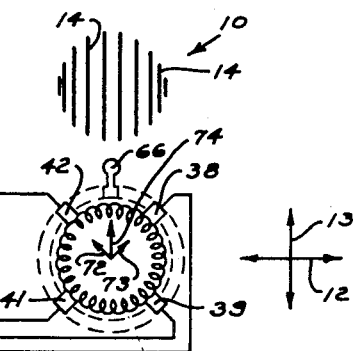
INVENTOR.
LELAND CLAY WEATHERS
BY Bacon & Thomas
Attorneys

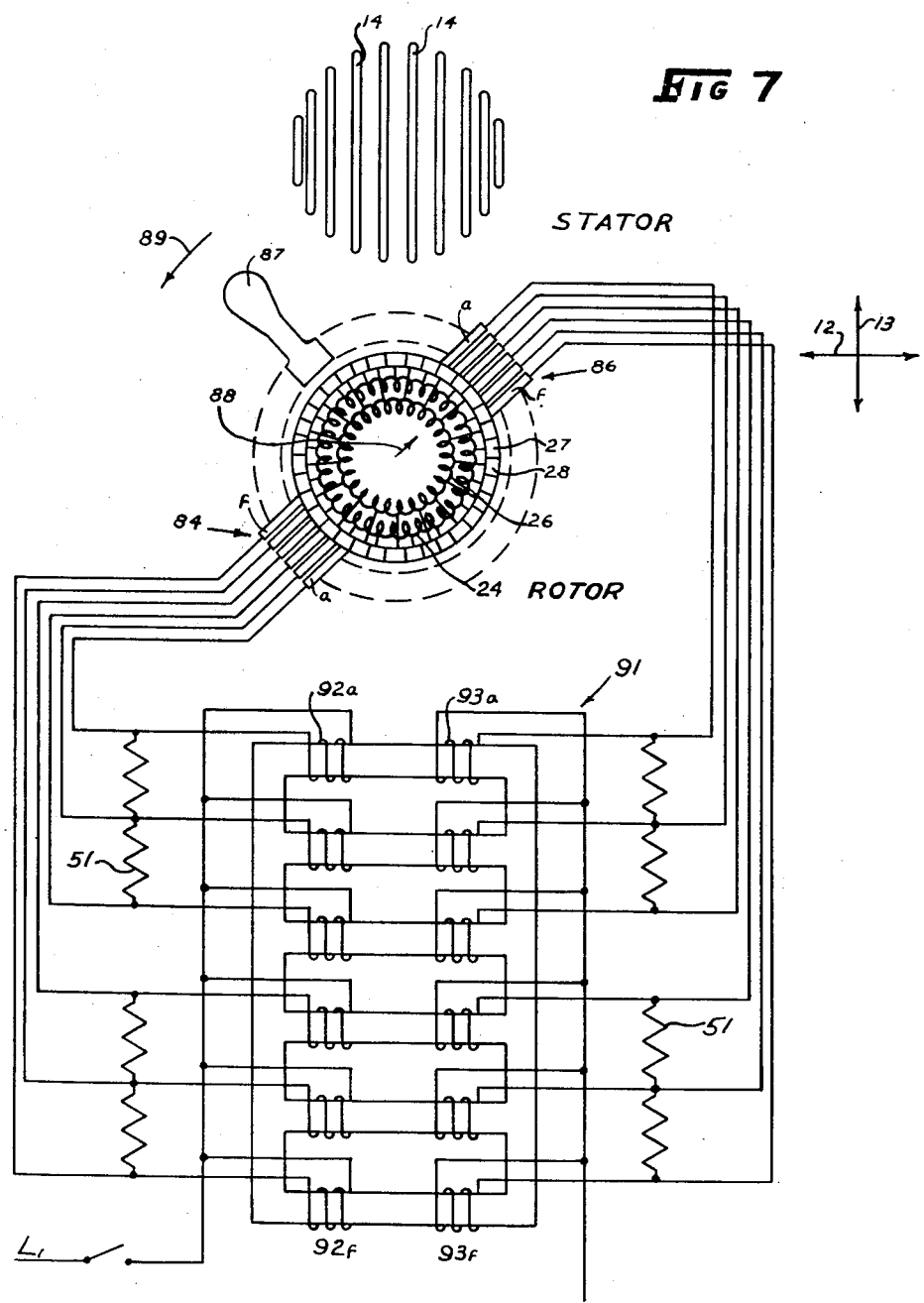

Patented Apr. 25, 1950

2,505,019

UNITED STATES PATENT OFFICE 2,505,019

ALTERNATING-CURRENT COMMUTATOR MOTOR

Leland Clay Weathers, Plymouth, Mich., assignor to Vickers Incorporated, Detroit, Mich., a corporation of Michigan Application June 8, 1948, Serial No. 31,731

18 Claims. (Cl. 318—244)

This invention relates to power transmission, and more particularly, to an alternating current motor of the commutator type having operating characteristics generally similar to series motors.

The motors of the present invention preferably have a low impedance stator winding which is short circuited in the power axis of the motor to confine substantially all of the air gap flux to the excitation axis. Both the excitation current and power current are applied to the armature through brushes and in all cases the excitation currents and power currents are maintained in phase with each other. Torque is produced by the interaction of the flux in the excitation axis due to the excitation component of the armature current and current in the stator windings produced by the power component of the armature current as a result of transformer action.

The preferred motors have an arrangement for adjusting the ratio of power current to excitation current so that the motor can be adjusted to develop the maximum torque possible without overheating at any desired speed. That is to say, the motor can be adjusted so that the iron thereof has a saturation just below the knee of the saturation curve for full load current at any desired speed. This is accomplished by shifting the brushes on the commutator. Since the brushes short circuit armature coils which contain either transformer voltages or speed voltages or both, the motor system of the present invention includes a commutation system which substantially prevents short circuit currents due to the voltages referred to in any position of the brushes.

It is therefore an object of the invention to provide an improved alternating current motor and motor system having series motor characteristics.

Another object of the invention is to provide an alternating current motor of the commutator type having series motor characteristics, in which the excitation and power currents are maintained in phase and the ratio of excitation to power current can be adjusted to enable the motor to develop maximum torque at any desired speed.

Another object of the invention is to provide an alternating current motor of the commutator type in which the brushes may be shifted to enable the motor to develop maximum torque at any desired speed and in which armature coil short circuit currents are substantially prevented in any position of the brushes.

Another object of the invention is to provide an improved alternating current motor in which both the excitation and power currents are supplied to an armature through a commutator and the stator winding confines the air gap flux substantially to the excitation axis of the motor.

Other objects and advantages of the invention will appear from the following description of preferred embodiments shown in the attached drawings in which:

Figure 1 is a schematic diagram of a complete motor system in accordance with the present invention;

Figure 2 is a fragmentary development of the armature winding;

Figure 3 is a diagrammatic end elevation of a suitable stator structure;

Figure 4 is a vertical section taken on the line 4—4 of Figure 3;

Figure 5 is a simplified schematic diagram of the motor circuit of Figure 1 showing the brushes in a different position;

Figure 6 is a view similar to Figure 5 illustrating a modified motor; and

Figure 7 is a view similar to Figure 1 illustrating a further modified motor.

Referring more particularly to the drawings, the motor shown in Fig. 1 may include a stator indicated diagrammatically at 10 and a rotor indicated diagrammatically at 11. The stator is provided with a low impedance winding short circuited in the power axis indicated by the double-ended arrow 12 adjacent the rotor in Fig. 1 so as to confine substantially all of the air gap flux to the excitation axis indicated by the double-ended arrow 13, also adjacent the rotor in Fig. 1. The stator winding is made up of a plurality of U-bar elements 14 shown diagrammatically in Fig. 1 to indicate the electrical effect of the winding. This winding per se is disclosed and claimed in my copending application Serial No. 710,644, filed November 18, 1946, now Patent No. 2,490,181, granted December 6, 1949. The actual form of the winding is more clearly shown in Figs. 3 and 4 and consists of a plurality of copper bars 16 positioned in partly closed slots 17 in a laminated stator iron structure 18. Pairs of U-bars 16 are connected together at one end of the stator by arcuate connecting bars 19 to form U-bar winding elements of which the bars 16 constitute the legs. The opposite end of the bars 16 may be connected together through short circuiting connections which may be a continuous ring but which is preferably made up of separate members 21 each connected to a set of bars 16 made up of a plurality of the pairs referred to above. The electrical effect of this winding is the same as that of closed conducting loops positioned in parallel planes as indicated in Fig. 1. While a stator winding for a two-pole motor is disclosed in Figs. 1, 3 and 4, it is apparent that similar windings for a motor having any number of pairs of poles may be provided. The short circuiting members 21 preferably have a central portion 22 of greater cross-sectional area than the end portions since the current through the central portion 22 is much greater than that through the end portions. Also, the laminations of the stator iron 18 may be cut away adjacent the poles of the motor, as indicated at 23, as the total flux through this portion of the iron is much less than through the portions of the iron between the poles.

The motors of the present invention, as shown in Fig. 1, are preferably provided with two separate and electrically independent closed armature windings 24 and 26. The number of commutator bars are equal to twice the number of coils in each winding and the coils of the winding 24 are connected to alternate commutator bars 27 while the coils of the winding 26 are connected to the other alternating commutator bars 28. The rotor iron may be similar to the armature iron employed in conventional direct current commutator motors except that it is provided with laminations suitable for alternating current operation and may have a number of slots equal to the number of coils in each winding 24 or 26. In order to make the two windings symmetrical with respect to their respective commutator bars, the coils of one winding must be positioned an electrical angle from the coils of the other winding which is equal to half the distance between the slots in the rotor iron, there being twice as many commutator bars as slots. This is accomplished, as illustrated diagrammatically in Fig. 2, by winding each of the coils of both windings so that one half of each coil has one pitch and the other half of the same coil has another pitch.

Two complete coils of one winding 24 are illustrated in Fig. 2. Thus, starting with the commutator bar 27 furtherest to the left in Fig. 2, one of the coils may have a portion 29 positioned in a slot indicated by the dotted line 31, another portion 32 positioned in a slot indicated by the dotted line 33, a third portion 34 also positioned in the slot 31 and a fourth portion 36 positioned in a slot indicated by the dotted line 37 adjacent the slot 33. This coil then terminates at the next commutator bar 27. The various portions of the coil all have the same number of conductors which means that the coil is divided into two halves having different pitches. Such a winding can be carried completely around the armature to close at the commutator bar 27 nearest the left of Fig. 2. The other winding 26 is omitted from Fig. 2 for clearness, but may be positioned in the same slots as the winding 24 and be exactly similar to the winding 24 except that it progresses in the opposite direction around the armature. The coils of the other winding 26 are connected to the alternate commutator bars 28. With the windings just described, it will be found that the coils of one winding are angularly spaced around the armature from the coils of the other winding an electrical angle equal to the electrical angle between adjacent commutator bars. This winding per se is disclosed and claimed in my copending application Serial No. 41,114, filed July 28, 1948.

The two-pole motor of Fig. 1 is shown as having four similar multiple brush structures, 38, 39, 41 and 42. Each of these brush structures are shown as being made up of six separate brush elements *a* to *f*, inclusive. The width and spacing of these brush elements are correlated with the width and spacing of the commutator bars such that twice the width of a brush element plus the distance between adjacent brush elements is not greater than the distance between centers of adjacent commutator bars plus the distance between adjacent commutator bars and such that the width of a brush element plus twice the distance between adjacent brush elements is not less than the distance between the centers of adjacent commutator bars minus the distance between adjacent commutator bars. With this relationship, it is found that three brush elements approximately span two commutator bars, i. e., six brush elements approximately span four commutator bars, and also that it is impossible to directly short circuit any armature coil of either of the two windings through a single brush element or any combination of brush elements. Six brush elements in each brush structure are the minimum number which give satisfactory operation in the two-pole duplex lap wound motor disclosed herein. As shown in Fig. 1, each of the brush elements of the brush structures 38, 39, 41 and 42 is provided with a separate lead or conductor.

In the position of the brushes shown in Fig. 1, the brush elements of brush structures 38 and 41 supply the excitation current to the motor and any armature coils having both ends in contact with brush elements of these brush structures through the commutator bars, have speed voltages induced therein when the armature rotates. Any armature coils short circuited by brush structures 39 and 42 in the position of the brushes shown in Fig. 1 have transformer voltages induced therein irrespective of rotation of the armature. As described in detail later, the brush structures of Fig. 1 may be shifted around the commutator and in any other angular position of the brush structures the armature coils short circuited by any brush structure have both speed voltages and transformer voltages induced therein. These voltages would ordinarily result in large short circuit currents flowing through the brush structures and the short circuited armature coils. In order to provide effective commutation, these shore circuit currents must be substantially prevented.

To prevent the short circuit currents above discussed, a reactor structure is provided for each pair of electrically opposite brush structures. Thus, the brush elements *a* to *f*, inclusive, of the brush structure 38 are connected to the reactor coils 38*a* to 38*f*, respectively, of a reactor 43 having a core 44 provided with six legs. Similarly, the brush elements *a* to *f*, inclusive, of brush structure 41 are connected to one terminal of reactor coils 41*a* to 41*f*, respectively, positioned on the core 44 of the reactor 43. It will be noted that reactor coils connected to brush elements always having the same current demand in the brush structures 38 and 41 are positioned on the same leg of the reactor core 44. That is to say, brush element *a* of brush structure 38 always has the same current demand as brush element *a* of brush structure 41 and the reactor coil 38*a* connected to brush element *a* of brush structure 38 is positioned on the same leg of the reactor core 44 as reactor coil 41*a* connected to brush element *a* of brush structure 41, etc.

All of the reactor coils 38*a* to 38*f*, inclusive, have their other terminals connected to a conductor 46' and all of the reactor coils 41a to 41f, inclusive, have their other terminals connected to a conductor 47. All of the reactor coils on the core 44 are connected so that current flowing through these coils and through the armature by way of brush structures 38 and 41 produce magnetomotive forces in the core 44 which are all in the same direction in Figure 1. The magnetomotive forces due to such armature current at one instant may be indicted by the half-arrows 49 adjacent the various reactor coils of the core 44. If the ampere turns on each leg of the reactor core 44 are equal, no substantial impedance is presented to flow of current through the reactor and the armature as the magnetomotive forces shown by the half-arrows 49 oppose each other in the core 44 so that no substantial flux is produced therein. On the other hand, it will be found that magnetomotive forces caused by short circuit current in coils undergoing commutation will add in the core 44 to produce flux therein through paths of low reluctance. Reactor 43 therefore presents high impedance to flow of short circuit currents while presenting substantially no impedance to flow of currents through the armature between the electrically opposite brush structures 38 and 41. In fact, the current control by the reactor 43 thus far described is too rigid and shunt resistors 51 between certain of the brush elements are provided to somewhat diminish the current control.

The reactor structure without the shunt resistors 51 requires that the current through each of the brush elements of both brush structures 38 and 41 be substantially equal if all of the reactor coils on the reactor core 44 have the same number of turns and even if these coils have a different number of turns, it requires that the currents through the various brush elements remain proportional at all times. On the other hand, for uniform current flow through the armature, it is found that the current through each brush element must vary. If the current through each brush element is not allowed to vary, the current in the two windings and the two halves of each winding must vary at commutator ripple frequency. Variation of the armature current in the two windings and in each half of the two windings at commutator ripple frequency is not practical as the leakage reactance imposes a high impedance to flow of armature current and also the variation of armature current at such frequency produces excessive iron losses in the armature. By providing the shunt resistors 51 of relatively high resistance, it has been found that sufficient variation of the current through the brush elements is provided to enable uniform and balanced armature currents to flow while at the same time any armature coil short circuit currents through the shunt resistors 51 are held to a very low value. The shunt resistors 51 are connected between brush elements a and b, brush elements b and c, brush elements d and e and brush elements e and f of each brush structure, but no shunt resistors are connected between brush elements c and d or between brush elements a and f.

The brush elements a to f, inclusive, of brush structure 39 are connected to reactor coils 39a to 39f, respectively, of the core 44 of a reactor 46 and similarly, the brush elements a to f, inclusive, of brush structure 42 are connected to reactor coils 42a to 42f, inclusive, of reactor 46. The reactor 46 may be identical with the reactor 43 and operates in the same manner. It will therefore not be further described. Shunt resistors 51 are also employed in conjunction with reactor 46 in a manner exactly similar to the employment of shunt resistors 51 in conjunction with the reactor 43 and for the same purpose. All of the reactor coils 39a to 39f have their other terminal connected to a conductor 52 and all of the reactor coils 42a to 42f, inclusive, have their other terminal connected to a conductor 53. The commutation system disclosed herein is described in somewhat more detail in my copending application Serial No. 696,006, filed September 10, 1946, and is disclosed and claimed in my copending application Serial No. 139,457, filed January 19, 1950 and any of the modified commutation systems suitable for alternating current motors shown in said copending applications can be employed with the motor of the present invention.

Current from a single phase alternating current source indicated by the line $L_1$ and $L_2$ is supplied through conductors 43' and 47 and the reactor 43 to the brush elements of brush structures 38 and 41. A series transformer 54 has its primary winding 56 in series in the last-described circuit, i. e., the winding 56 is connected between the line $L_2$ and the conductor 46'. The secondary 57 of the series transformer 54 supplies current to the brush elements of brush structures 39 and 42 through either the contacts 58 of a contactor 59 or the contacts 61 of a contactor 62, conductors 52 and 53 and reactor 46. The brushes and contactors of the system of Fig. 1 are shown in the dynamic braking position in which the two contactors 59 and 62 short circuit both the transformer secondary winding 57 and the brush structures 39 and 42. That is to say, both contactors 59 and 62 are shown in a closed position but upon opening of contactor 59, contactor 62 connects secondary winding 57 to the brush elements 39 and 42 and upon again closing contactor 59 and opening contactor 62, contactor 59 again connects secondary winding 57 with the brush structures 39 and 42 but reverses the connection between the secondary 57 and the brush structures 39 and 42. The contactors 59 and 62 are of the normally open type and are held in their closed position by energization of their operating coils 63 and 64, respectively.

The operating coils 63 and 64 are selectively energized by a switch forming part of a brush shifting structure having a handle 66. The handle 66 is provided with a switch contact member 67 engaging both contacts 68 and 69 in the position shown in Figure 1. The contact member 69 is connected to line $L_2$ and the contacts 68 and 69 are connected to one terminal of the operating coils 63 and 64 respectively. The other terminals of these coils are connected to the line $L_1$. In the position of the handle 66 shown in Figure 1, both contactor operating coils 63 and 64 are energized to hold the contactors in closed position but angular movement of the handle 66 carrying the contact member 67 will de-energize one of the coils 63 or 64 to open the contacts associated therewith. This will connect the brush structures 39 and 42 in series with the secondary 57 of the series transformer in one direction or the other, depending upon the direction of movement of the handle 66.

All of the brush structures 38, 39, 41 and 42 may be mounted upon a rotatable brush ring 71, indicated by dotted lines, and the handle 66 may likewise be secured to the brush ring 71 so that angular movement of the handle 66 angularly shifts the brush structures on the commutator while at the same time moving the contact member 67. Figure 5 shows the handle 66 rotated through a small angle to the right. The circuit of Figure 5 is the same as that of Figure 1 except that the commutation system reactors have been omitted, the brush structures 38, 39, 41 and 42 have been shown as single brushes and a single armature winding has been shown instead of the dual winding of Figure 1. The showing of Figure 5 is for the purpose of simplifying the circuit of Figure 1 for purposes of explanation of the operating characteristics of the motor. Except for commutation difficulties, the circuit of Figure 5 is operative.

In Figure 5 the vector 72 indicates the magnetomotive force due to current flowing in the armature windings between the brush structures 38 and 41. In a similar manner, vector 73 indicates the magnetomotive force due to currents flowing in the armature windings between the brush structures 42 and 39. It will be noted that movement of the handle 66 has caused opening of the contactor 59 to remove the short circuit from the brush structures 42 and 39 and that the secondary 57 of the series transformer 54 is connected across the brush structures 42 and 39 by the contactor 62. The magnetomotive forces indicated by the vectors 72 and 73 are equal in magnitude since the series transformer 54 requires that the current flowing between the brush structures 38 and 41 be substantially equal to the current flowing between brush structures 42 and 39. The vectors 72 and 73 representing the magnetomotive forces due to these currents are 90 electrical degrees from each other because of the quadrature positioning of the brush structures. Since the two currents flowing in the armature winding are in phase with each other due to the series transformer, the resultant magnetomotive force in space is indicated by the vector 74 and is at an angle of 45 electrical degrees to each of the brush axes.

The magnetomotive force 74 has a component parallel to the excitation axis, the latter being indicated by the double-ended arrow 13, and produces an excitation flux in the iron of the motor in the excitation axis. The magnetomotive force 74 also has a component in the power axis of the machine, the latter being indicated by the double-ended arrow 12, but substantially no flux can be produced in the power axis because of the short circuited stator winding made up of the U-bar elements 14. Currents, however, flow in the U-bar elements 14 as this winding is the equivalent of short circuited transformer secondary windings for any component of magnetomotive force in the power axis due to flow of current in the armature windings. The motor therefore provides a path of low impedance for current flow through the armature winding in the power axis. There is, however, considerable impedance to flow of current through the armature windings in the excitation axis as the armature winding acts in this axis like the primary of a transformer with an open secondary. The total impedance to current flow presented by the armature windings is equal to the sum of the impedance of the windings in the two axes because of the series transformer connection.

When the handle 66 is in the position shown in Fig. 1, the brush structures 38 and 41 are in the excitation axis and since secondary 57 of the series transformer 54 is short circuited and the brush structures 39 and 42 are also short circuited, the only current flowing in the armature windings when the motor is at a standstill is due to current flow between the brush structures 38 and 41, the magnetomotive force 72 is the only magnetomotive force acting and this magnetomotive force is in the excitation axis. The armature windings will, therefore, ordinarily be designed such that the armature windings take full load current in the position of the brushes shown in Fig. 1 with the motor at a standstill. That is to say, the armature windings will have a number of turns between the brushes 38 and 41 such that the armature windings are carrying an amount of current equal to that which can continuously flow without overheating the motor and the motor is likewise designed such that this amount of current produces a flux which carries the saturation point of the iron just below the knee of the saturation curve. Since the secondary winding 57 of the transformer 54 is short circuited, the transformer introduces substantially no impedance into the circuit of the brush structures 38 and 41 and full line voltage is applied between these brush structures.

In the position of the brushes shown in Fig. 5, torque is developed due to interaction of the current flowing in the U-bar stator windings 14 and the flux in the excitation axis 13, or otherwise stated, by interaction of the current flowing in the power axis in the armature windings and the flux in the excitation axis. Both of these statements are true as the current flowing in the power axis in the armature windings is substantially directly proportional to the current flowing in the U-bar stator windings. This torque will cause the armature to rotate and pick up speed and such rotation of the armature will induce a speed voltage in the power axis of the armature winding due to the conductors of the armature winding cutting the flux in the excitation axis. This speed voltage has a component in each of the brush axes which opposes the voltages applied between the brush structures 38 and 41 and between the brush structures 42 and 39 to oppose current flow in each of the brush axes. This in turn reduces the component of magnetomotive force in the excitation axis to reduce the flux and the armature speed continues to increase. If the motor is loaded, however, the motor will run at a definite speed for a given load, the speed being that at which the speed voltage or back voltage plus the impedance drops in the armature equal the applied voltages. In this connection, it is to be noted that all impedances and voltage drops and currents in the circuit in series with the brush structures 42 and 39 are reflected into the circuit in series with the brush structures 38 and 41 by reason of the series transformer 54 such that all of the back voltage and impedance drops in the armature circuit are effective to oppose the applied voltage from the lines $L_1$ and $L_2$.

It is apparent that within a total angle of 90° or 45° on each side of the position shown in Fig. 1, the nearer the axis of the brush structures 38 and 41 to the excitation axis 13, the greater the ratio of excitation current to power current, and similarly, the further the brush structures 38 and 41 are rotated from the excitation axis, the smaller the ratio of excitation current to power current. This means that the position of the brushes can be adjusted such that the motor can be caused to have its maximum designed excitation for full load at any desired speed within wide limits. Thus, the motor can be adjusted by movement of the handle 66 to develop its maximum torque at any desired speed. This adjustment can be made at any time during the operation of the motor.

If the motor is running and the handle 66 is moved from a position such as shown in Fig. 5 to the position shown in Fig. 1, the maximum excitation of the motor is produced and the brush structures 42 and 39 in the power axis are short circuited. Continued rotation of the motor due to inertia of the motor or load causes speed voltages to be induced in the armature windings by generator action to produce currents in the power axis reacting with the flux in the excitation axis to produce a torque opposing rotation of the motor. This produces dynamic braking to rapidly decrease the speed of the motor and if the movement of the handle 66 is continued to the left, the motor is reversed and will produce torque in the opposite direction.

The commutation circuit, including divided brush structures 38, 39, 41 and 42 and the reactors 43 and 46, in conjunction with the shunt resistors 51 enable the brush structures to be rotated to any position upon the commutator without permitting substantial flow of armature coil short circuit current. This prevention of armature short circuit current substantially completely eliminates any arcing or sparking at the contact between the brush elements and the commutator and enables effective commutation at any position of the brush structures. In fact, commutation is as good or better than that of well designed direct current machines having the brushes properly positioned upon the commutator. The commutation is better when the armature windings each have an odd number of coils but effective commutation can be accomplished with an even number of coils in each winding.

As illustrated in Figure 6, the motor of the present invention can be operated without the reversing contactors 59 and 62 and without the contact member 67 carried by the handle 66 and the associated contacts 68 and 69. In Figure 6, the commutation system reactors are not shown and single brush element structures 38, 39, 41 and 42 have been shown in order to simplify the diagram. It is understood, however, that the circuit of Figure 6 will include a dual armature winding, multiple brush structures and reactors 43 and 46, or their equivalents in a manner similar to the circuit shown in Figure 1. In this motor, it will be apparent that the neutral position of the brush structures, i. e., the position at which no torque is developed in the motor, will be the position in which the resultant magneto-motive force 74 is parallel to the excitation axis 13. The motor will ordinarily be designed such that the motor takes full load current in the neutral position and the iron is operated at a saturation just below the knee of the saturation curve. Upon moving the handle 66 to rotate the brush structures 38, 39, 41 and 42 in either direction from the position shown, a torque will be developed in the same manner as explained with reference to Figure 5. This movement of the handle 66 in one direction from the neutral position will cause the motor to rotate in one direction and movement of the handle in the other direction from the neutral position will cause the motor to rotate in the other direction. Again, the position of the brush structures may be adjusted such that the motor will develop its maximum torque at any desired speed without overheating the motor. Moving the handle 66 to neutral position when the motor is running will not, however, produce dynamic braking, although substantially the same result can be produced by carrying the handle 66 slightly past the neutral point to produce a reverse torque.

A somewhat different type of transformer 76, having a three-legged core 77, is illustrated. This transformer has a primary winding 78 wound on one of the legs of the core 77, preferably the center leg, and has two secondary windings 79 and 81, each wound on another leg of the core 77. The primary winding 78 is connected across the lines $L_1$ and $L_2$ while the secondary winding 79 is connected across electrically opposed brushes such as brushes 38 and 41 and the secondary winding 81 is connected across electrically opposed brushes 39 and 42. The characteristic of this type of transformer core must remain substantially equal. This means that the currents in the circuits connected to the secondaries 79 and 81 must remain substantially equal and in phase with each other. Also, the sum of the impedances of the two circuits connected to the secondaries 79 and 81 is reflected into the primary circuit of the transformer and the same is true of any voltages induced in the two circuits. In other words, the transformer 76 is entirely equivalent in operation to the transformer 54 of Figs. 1 and 5 and could be substituted for the transformer 54. On the other hand, the transformer 54 could be substituted for the transformer 76 of Fig. 6.

The motor of Fig. 7 is similar in structure and operation to the motor of Fig. 6 except that it is provided with a single pair of brush structures, instead of the two pairs of brush structures shown in Fig. 6. Thus the motor of Fig. 7 is provided with a short circuited stator winding made up of U-bar elements 14 and an armature having dual windings 24 and 26 which may be identical with the equivalent windings shown in Fig. 1. The brush structures 84 and 86 of Fig. 7 are positioned at electrically opposite points on the commutator and may be shifted around the commutator by means of the handle 87. The brushes are shown in one running position, i. e., at an angle to both the power axis 12 and the excitation axis 13. In this position the current through the armature windings produces a magnetomotive force which is also at an angle to both the power and excitation axis of the motor, this magnetomotive force being indicated by the arrow 88. This magnetomotive force has a component parallel to the excitation axis 13 to produce a flux in the excitation axis. The magnetomotive force also has a component parallel to the power axis 12 but substantially no flux can be produced in this axis because of the short circuited stator winding. In the position of the brushes shown a torque is produced in the same manner as described with reference to Figs. 1 and 5. The motor of Fig. 7 also has series motor characteristics, the torque increasing and the speed decreasing as the load is increased.

As is the case in the motors previously described, the brushes may be shifted so that the motor will develop its maximum torque at any desired speed without overheating the motor. If desired, the motor may be constructed so that the handle 87 may be moved in the direction of the arrow 89 to carry the brush structures 84 and 86 into alignment with the excitation axis 13 which is a neutral position. In this neutral position, excitation is applied to the motor but the armature current has no component in the power axis and no torque is developed. As the handle 87 is moved further to shift the brushes past the neutral position, a torque is developed in the opposite direction so that the shifting of the brushes may be employed to reverse the motor. No dynamic braking is produced in the neutral position but substantially the same effect can be obtained by carrying the handle 87 slightly past the neutral position to produce a reverse torque.

The motor of Fig. 7 under running conditions has its brushes positioned so that the armature coils undergoing commutation have substantial speed voltages induced therein and also substantial transformer voltages induced therein. It is possible to find a position of the brushes on the commutator for a given speed and load which causes these induced voltages in the armature coils undergoing commutation to substantially cancel out but in order to prevent sparking at the commutator under any load and speed conditions, the motor is preferably provided with the dual armature windings 24 and 26 discussed above as well as multiple brush structures 84 and 86 and a circuit for preventing flow of armature coil short circuit currents between the various brush elements. This latter circuit may include a reactor 91 which may be identical with either of the reactors 43 and 46 of Fig. 1. That is to say, the brush elements *a* to *f* of the brush structure 84 are connected to one side L₁ of a single phase line through reactor coils 92*a* to 92*f*, respectively, and the brush elements *a* to *f* of the brush structure 86 are connected to the other side L₂ of the single phase line through reactor coils 93*a* to 93*f*, respectively. These reactor coils present low impedance to flow of armature power and exciting currents but present high impedance to flow of armature coil short circuit currents between the brush elements of each brush structure. In conjunction with the shunt resistors 51 they substantially prevent flow of armature coil short circuit currents in any position of the brush structures 84 and 86 upon the commutator while at the same time provide for flow of substantially equal or balanced armature currents in both armature windings 24 and 26 and in both sides of each of these windings.

From the above description of the invention, it is apparent that I have provided an improved alternating current motor having series motor characteristics. The motor is of the commutator type in which both excitation current and power current is supplied to the armature windings, but a commutation system is provided which enables effective commutation in any position of the brushes upon the commutator. Torque is produced by confining the flux in the motor to substantially a single axis by reason of a low impedance stator winding short circuited in the power axis and then producing a resulting magnetomotive force in the armature winding at an angle to the excitation axis. The various modifications of the motor enable dynamic braking to be produced, and adjustment of the brushes upon the commutator enables the motor to develop its maximum torque at any speed developed without overheating the motor. Both of these features may be incorporated into a single motor.

This application is a continuation-in-part of my copending application Serial No. 710,643, filed November 18, 1946, now abandoned.

I claim:

1. In an alternating current motor having a stator member and a rotatable armature member provided with a commutator and an armature winding with coils connected to commutator bars of said commutator to form a closed winding, a low impedance winding on said stator member short circuited in the power axis of said motor to confine substantially all of the mutual flux in said motor to the excitation axis of said motor, and means for supplying both the excitation current and power current of said motor to said armature winding to produce a resultant magnetomotive force in said armature at an angle to both said axes so as to have a component in said excitation axis producing said mutual flux and a component in said power axis, said means comprising brushes contacting said commutator at electrically opposed positions and conductors connecting said brushes to a source of alternating current power.

2. In an alternating current motor having a stator member and a rotatable armature member provided with a commutator and an armature winding with coils connected to commutator bars of said commutator to form a closed winding, a low impedance bar winding on said stator member short circuited in the power axis of said motor to confine substantially all of the mutual flux in said motor to the excitation axis of said motor, means for supplying both the excitation current and power current of said motor to said armature winding to produce a resultant magnetomotive force in said armature at an angle to both said axes so as to have a component in said excitation axis producing said mutual flux and a component in said power axis, said means comprising brushes contacting said commutator at electrically opposed positions and conductors connecting said brushes to a source of alternating current power, said brushes being mounted for simultaneous shifting circumferentially of said commutator to vary the ratio of said exciting current to said power current, and means for shifting said brushes.

3. In an alternating current motor having a stator member and a rotatable armature member provided with a commutator and an armature winding with coils connected to commutator bars of said commutator to form a closed winding, a low impedance winding on said stator member short circuited in the power axis of said motor to confine substantially all of the mutual flux in said motor to the excitation axis of said motor, means for supplying both the excitation current and power current of said motor to said armature winding to produce a resultant magnetomotive force in said armature at an angle to both said axes so as to have a component in said excitation axis producing said mutual flux and a component in said power axis, said means comprising a first pair of brush structures contacting said commutator at electrically opposed positions and another pair of brush structures contacting said commutator at electrically opposed positions circumferentially spaced on said commutator from the positions of said first pair, separate circuits for connecting each of said pairs of brush structures to a source of alternating current power, said circuits being electrically isolated from each other exteriorly of said armature, and means magnetically coupling said circuits to maintain the currents in said circuits substantially equal and in phase with each other.

4. In an alternating current motor having a stator member and a rotatable armature member provided with a commutator and an armature winding with coils connected to commutator bars of said commutator to form a closed winding, a low impedance winding on said stator member short circuited in the power axis of said motor to confine substantially all of the mutual flux in said motor to the excitation axis of said motor, means for supplying both the excitation current and power current of said motor to said armature winding to produce a resultant magnetomotive force in said armature at an angle to both said axes so as to have a component in said excitation axis producing said mutual flux and a component in said power axis, said means comprising a first pair of brush structures contacting said commutator at electrically opposed positions and another pair of brush structures contacting said commutator at electrically opposed positions circumferentially spaced on said commutator from the position of said first pair, separate circuits for connecting each of said pairs of brush structures to a source of alternating current power, said circuits being electrically isolated from each other exteriorly of said armature, means magnetically coupling said circuits to maintain the currents in said circuits substantially equal and in phase with each other, said brush structures being mounted for simultaneous shifting circumferentially of said commutator to vary the ratio of said exciting currents to said power current, and means for shifting said brush structures.

5. In an alternating current motor having a stator member and a rotatable armature member provided with a commutator and an armature winding with coils connected to commutator bars of said commutator to form a closed winding, a low impedance winding on said stator member short circuited in the power axis of said motor to confine substantially all of the mutual flux in said motor to the excitation axis of said motor, means for supplying both the excitation current and power current of said motor to said armature winding to produce a resultant magnetomotive force in said armature at an angle to both said axes so as to have a component in said excitation axis producing said mutual flux and a component in said power axis, said means comprising a first pair of brush structures contacting said commutator at electrically opposed positions and another pair of brush structures contacting said commutator at electrically opposed positions circumferentially spaced on said commutator from the position of said first pair, circuits for connecting each of said pairs of brush structures to a source of alternating current power, said circuits being electrically isolated from each other exteriorly of said armature, means magnetically coupling said circuits to maintain the currents in said circuits substantially equal and in phase with each other, said brush structures being mounted for simultaneous shifting circumferentially of said commutator to vary the ratio of said exciting current to said power current, means for shifting said brush structures, and means for short circuiting one of said pairs of brush structures when the axis of said one pair is in the power axis of the motor to assist in stopping said motor.

6. In an alternating current motor having a stator member and a rotatable armature member provided with a commutator and an armature winding with coils connected to commutator bars of said commutator to form a closed winding, a low impedance winding on said stator member short circuited in the power axis of said motor to confine substantially all of the mutual flux in said motor to the excitation axis of said motor, means for supplying both the excitation current and power current of said motor to said armature winding to produce a resultant magnetomotive force in said armature at an angle to both said axes so as to have a component in said excitation axis producing said mutual flux and a component in said power axis, said means comprising a first pair of brush structures contacting said commutator at electrically opposed positions in the excitation axis of said motor, and a second pair of brush structures contacting said commutator at electrically opposed positions in the power axis of said motor, electrically independent circuits for connecting each of said pairs of brush structures to a source of alternating current power, means magnetically coupling said circuits to maintain the currents in said circuits substantially equal and in phase with each other, and means for short circuiting said second pair of brush structures to assist in stopping said motor.

7. In an alternating current motor having a stator member and a rotatable armature member provided with a commutator and an armature winding with coils connected to commutator bars of said commutator to form a closed winding, a low impedance winding on said stator member short circuited in the power axis of said motor to confine substantially all of the mutual flux in said motor to the excitation axis of said motor, means for supplying both the excitation current and power current of said motor to said armature winding to produce a resultant magnetomotive force in said armature at an angle to both said axes so as to have a component in said excitation axis producing said mutual flux and a component in said power axis, said means comprising a first pair of brush structures contacting said commutator at electrically opposed positions and another pair of brush structures contacting said commutator at electrically opposed positions circumferentially spaced on said commutator from the positions of said first pair, separate circuits for connecting each of said pairs of brush structures to a source of alternating current power, said circuits being electrically isolated from each other exteriorly of said armature, means magnetically coupling said circuits to maintain the currents in said circuits substantially equal and in phase with each other, and means in said circuits for substantially preventing flow of armature coil short circuit currents due to a brush structure making contact with both ends of one of said armature coils through said commutator.

8. In an alternating current motor having a stator member and a rotatable armature member provided with a commutator and a pair of electrically independent armature windings with coils connected to alternate commutator bars of said commutator to form closed windings, a low impedance winding on said stator member having U-bar elements short circuited in the power axis of said motor to confine substantially all of the mutual flux in said motor to the excitation axis of said motor, means for supplying both the excitation current and power current of said motor to said armature winding to produce a resultant magnetomotive force in said armature at an angle to both said axes so as to have a component in said excitation axis producing said mutual flux and a component in said power axis, said means comprising a first pair of brush structures having a plurality of circumferentially spaced brush elements, said brush structures contacting said commutator at electrically opposed positions, and a similar pair of brush structures contacting said commutator at electrically opposed positions circumferentially spaced on said commutator from the positions of said first pair so as to be in electrical quadrature with said first pair, electrically independent circuits for connecting each of said pairs of brush structures to a source of alternating current power, means magnetically coupling said circuits to maintain the currents in said circuits substantially equal and in phase with each other, said brush structures being mounted for simultaneous shifting circumferentially of said commutator to vary the ratio of said exciting current to said power current, means for shifting said brush structures, and means in said circuits cooperating with said pair of armature windings and said brush elements to substantially prevent flow of armature coil short circuit current.

9. In an alternating current motor having a stator member and a rotatable armature member provided with a commutator having circumferentially arranged commutator bars and a plurality of electrically independent armature windings each having coils connected to a separate series of equally spaced commutator bars of said commutator to form a closed winding, a low impedance winding on said stator member having U-shaped bar elements short circuited in the power axis of said motor to confine substantially all of the mutual flux in said motor to the excitation axis of said motor, means for supplying both the excitation current and power current of said motor to said armature windings to produce a resultant magnetomotive force in said armature at an angle to both said axes so as to have a component in said excitation axis producing said mutual flux and a component in said power axis, said means comprising an armature circuit including brush structures contacting said commutator at electrically opposed positions and a conductor for each of said brush structures for connecting said brush structures to a source of alternating current power, each of said brush structures including a plurality of circumferentially spaced brush elements insulated from each other and having separate leads connected to the corresponding conductor of each of said brush structures, the circumferential width and spacing of said brush elements being correlated with the circumferential width and spacing of said commutator bars to cause any armature coil short circuit current to flow through said leads, and means associated with said leads to substantially prevent such flow of short circuit current while providing for substantially equal currents in said armature windings.

10. In an alternating current motor having a stator member and a rotatable armature member provided with a commutator having circumferentially arranged commutator bars and a pair of electrically independent armature windings each having coils connected to alternate commutator bars of said commutator to form a closed winding, a low impedance winding on said stator member short circuited in the power axis of said motor to confine substantially all of the mutual flux in said motor to the excitation axis of said motor, means for supplying both the excitation current and power current of said motor to said armature windings to produce a resultant magnetomotive force in said armature at an angle to both said axes so as to have a component in said excitation axis producing said mutual flux and a component in said power axis, said means comprising a first pair of brush structures contacting said commutator at electrically opposed positions and another pair of brush structures contacting said commutator at electrically opposed positions circumferentially spaced on said commutator from the positions of said first pair so as to be in electrical quadrature with said first pair, electrically independent circuits for connecting each of said pairs of brush structures to a source of alternating current power, means magnetically coupling said circuits to maintain the currents in said circuits substantially equal and in phase with each other, each of said brush structures having a plurality of circumferentially spaced brush elements insulated from each other and having separate leads, the circumferential width and spacing of said brush elements being correlated with the width and spacing of said commutator bars to cause any armature coil short circuit currents to flow through said leads, and means including a reactor structure associated with said leads to substantially prevent said short circuit currents while providing for substantially equal currents in said armature windings.

11. In an alternating current motor having a stator member and a rotatable armature member provided with a commutator and an armature winding with coils connected to commutator bars of said commutator to form a closed winding, a low impedance winding on said stator member short circuited in the power axis of said motor to confine substantially all of the mutual flux in said motor to the excitation axis of said motor, and means for supplying both the excitation current and power current of said motor to said armature winding to produce a resultant magnetomotive force in said armature at an angle to both said axes so as to have a component in said excitation axis producing said mutual flux and a component in said power axis, said means comprising a single pair of brush structures for each pair of poles having brushes contacting said commutator at electrically opposed positions and conductors connecting said brushes to a source of alternating current power.

12. In an alternating current motor having a stator member and a rotatable armature member provided with a commutator and an armature winding with coils connected to commutator bars of said commutator to form a closed winding, a low impedance bar winding on said stator member short circuited in the power axis of said motor to confine substantially all of the mutual flux in said motor to the excitation axis of said motor, means for supplying both the excitation current and power current of said motor to said armature winding to produce a resultant magnetomotive force in said armature at an angle to both said axes so as to have a component in said excitation axis producing said mutual flux and a component in said power axis, said means comprising a single pair of brush structures for each pair of poles having brushes contacting said commutator at electrically opposed positions and conductors connecting said brush structures to a source of alternating current power, said brush structures being mounted for simultaneous shifting circumferentially of said commutator to vary the ratio of said exciting current to said power current, and means for shifting said brush structures.

13. In an alternating current motor having a stator member and a rotatable armature member provided with a commutator and an armature winding with coils connected to commutator bars of said commutator to form a closed winding, a low impedance winding on said stator member short circuited in the power axis of said motor to confine substantially all of the mutual flux in said motor to the excitation axis of said motor, means for supplying both the excitation current and power current of said motor to said armature winding to produce a resultant magnetomotive force in said armature at an angle to both said axes so as to have a component in said excitation axis producing a mutual flux and a component in said power axis, said means comprising brush structures contacting said commutator at electrically opposed positions, means for connecting said brush structures across a single phase source of alternating current power to complete a circuit through said armature, and means in said circuit for substantially preventing flow of armature coil short circuit currents due to a brush structure making contact through said commutator with both ends of one of said armature coils.

14. In an alternating current motor having a stator member and a rotatable armature member provided with a commutator and an armature winding with coils connected to commutator bars of said commutator to form a closed winding, a low impedance winding on said stator member short circuited in the power axis of said motor to confine substantially all of the mutual flux in said motor to the excitation axis of said motor, means for supplying both the excitation current and power current of said motor to said armature winding to produce a resultant magnetomotive force in said armature at an angle to both said axes so as to have a component in said excitation axis producing said mutual flux and a component in said power axis, said means comprising a single pair of brush structures for each pair of poles having brushes contacting said commutator at electrically opposed positions, means for connecting said brush structures across a single phase source of alternating current power to complete a circuit through said armature, and means in said circuit for substantially preventing flow of armature coil short circuit currents due to a brush structure making contact through said commutator with both ends of one of said armature coils.

15. In an alternating current motor having a stator member and a rotatable armature member provided with a commutator and an armature winding with coils connected to commutator bars of said commutator to form a closed winding, a low impedance bar winding on said stator member short circuited in the power axis of said motor to confine substantially all of the mutual flux in said motor to the excitation axis of said motor, means for supplying both the excitation current and power current of said motor to said armature winding to produce a resultant magnetomotive force in said armature at an angle to both said axes so as to have a component in said excitation axis producing said mutual flux and a component in said power axis, said means comprising a single pair of brush structures for each pair of poles having brushes contacting said commutator at electrically opposed positions, said brush structures being mounted for simultaneous shifting circumferentially of said commutator to vary the ratio of said exciting current to said power current, means for shifting said brush structures, means for connecting said brush structures across a single phase source of alternating current power to complete a circuit through said armature, and means in said circuit for substantially preventing flow of armature coil short circuit currents due to a brush structure making contact through said commutator with both ends of one of said armature coils.

16. In an alternating current motor having a stator member and a rotatable armature member provided with a commutator and an armature winding with coils connected to commutator bars of said commutator, a winding on said stator member short circuited in the power axis of said motor, and means including brush structures contacting said commutator for supplying excitation current and power current to said armature winding to produce a magnetomotive force in said armature at an angle to said power axis and at an angle to the excitation axis of said motor.

17. In an alternating current motor having a stator member and a rotatable armature member provided with a commutator and an armature winding with coils connected to commutator bars of said commutator, a winding on said stator member short circuited in the power axis of said motor, means including electrically opposed brush structures contacting said commutator for supplying excitation current and power current to said armature winding to produce a magnetomotive force in said armature at an angle to said power axis and at an angle to the excitation axis of said motor, and means for simultaneously shifting said brush structures circumferentially of said commutator to vary the ratio of said excitation current and said power current.

18. In an alternating current motor having a stator member and a rotatable armature member provided with a commutator and a closed armature winding with coils connected to commutator bars of said commutator, a winding on said stator member short circuited in the power axis of said motor, means including electrically opposed brush structures contacting said commutator for supplying excitation current and power current to said armature winding to produce a magnetomotive force in said armature at an angle to said power axis and at an angle to the excitation axis of said motor, and means for simultaneously shifting said brush structures circumferentially of said commutator to vary the ratio of said excitation current and said power current.

LELAND CLAY WEATHERS.

No references cited.